Sept. 25, 1956  C. A. STANDING  2,764,424
TRACTOR AND SEMI-TRAILER CONSTRUCTION
WITH STEERABLE REAR WHEELS
Filed Aug. 19, 1953  3 Sheets-Sheet 1
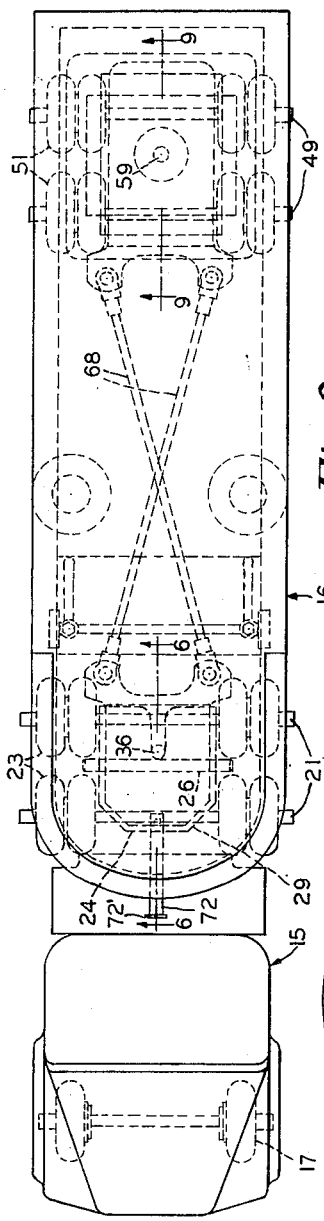
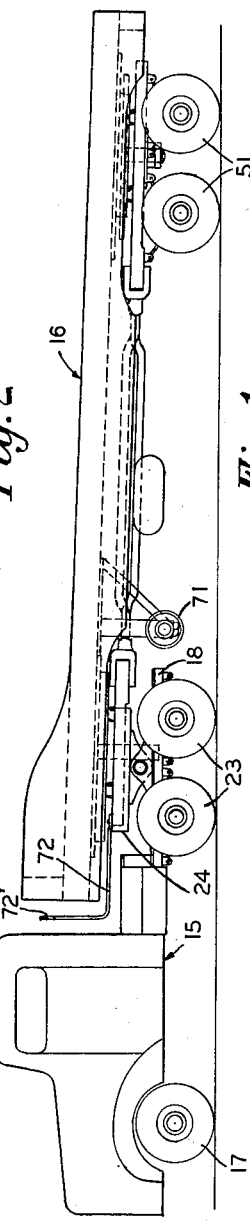
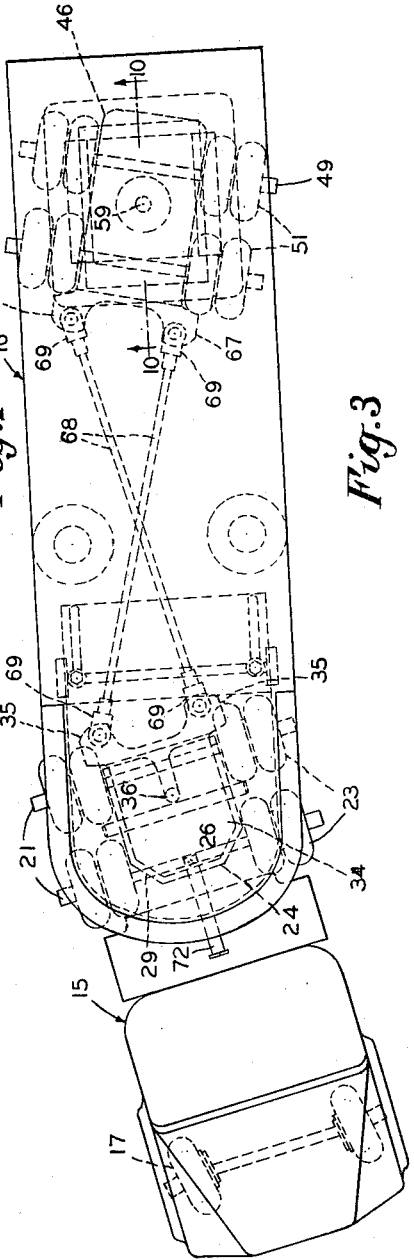
INVENTOR.
Charles A. Standing
BY
Frease & Bishop
ATTORNEYS Sept. 25, 1956 C. A. STANDING 2,764,424
TRACTOR AND SEMI-TRAILER CONSTRUCTION
WITH STEERABLE REAR WHEELS
Filed Aug. 19, 1953 3 Sheets-Sheet 2
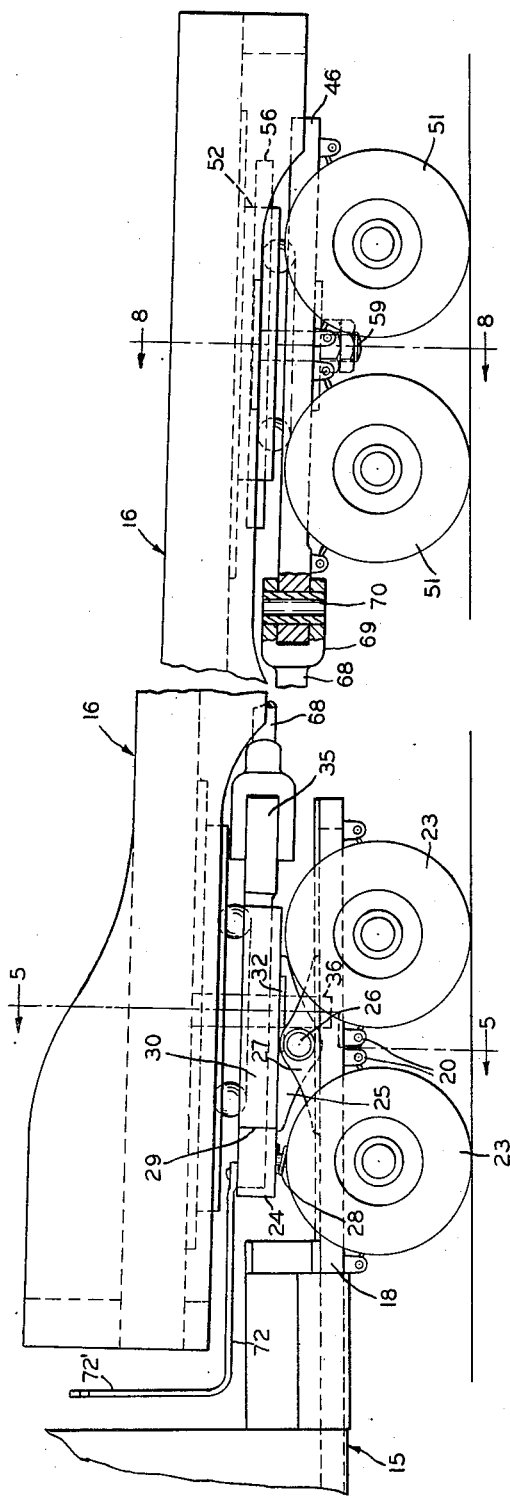
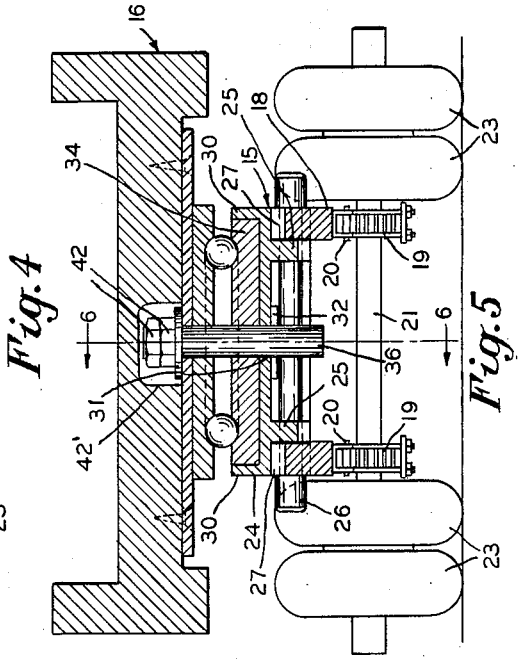
INVENTOR.
Charles A. Standing
BY
Frease & Bishop
ATTORNEYS Sept. 25, 1956  C. A. STANDING  2,764,424
TRACTOR AND SEMI-TRAILER CONSTRUCTION
WITH STEERABLE REAR WHEELS
Filed Aug. 19, 1953  3 Sheets-Sheet 3
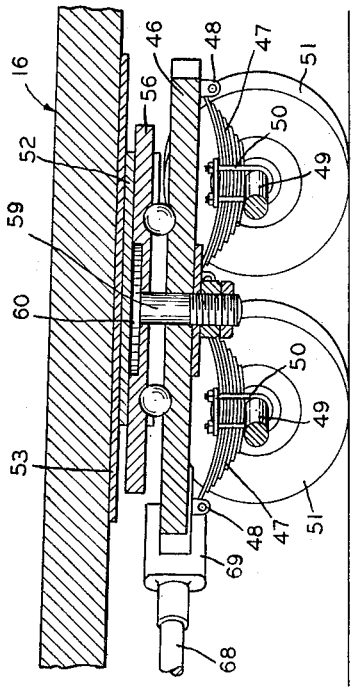
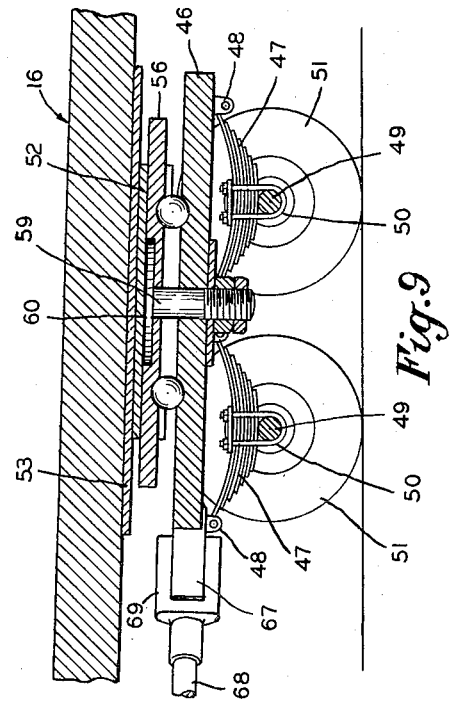
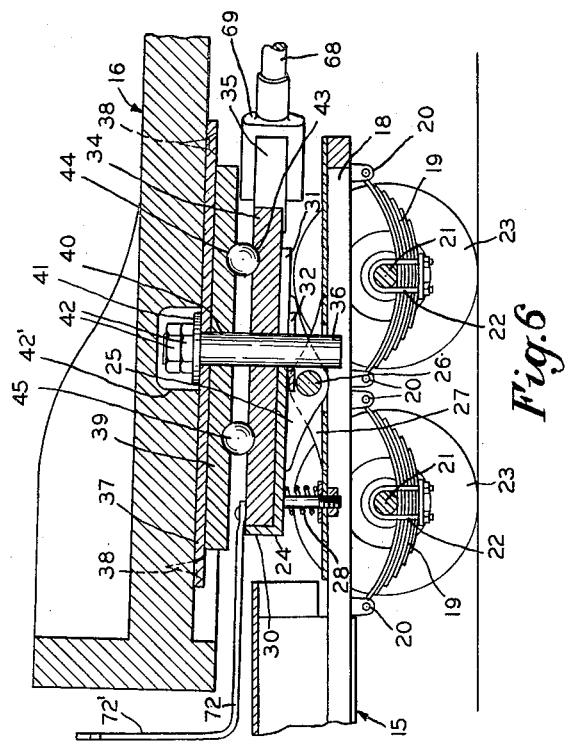
INVENTOR.
Charles A. Standing
BY
Frease & Bishop
ATTORNEYS

United States Patent Office 2,764,424
Patented Sept. 25, 1956

2,764,424

TRACTOR AND SEMI-TRAILER CONSTRUCTION WITH STEERABLE REAR WHEELS

Charles A. Standing, Alliance, Ohio

Application August 19, 1953, Serial No. 375,118

9 Claims. (Cl. 280—426)

The present invention relates to a tractor and semi-trailer construction and more particularly and specifically to such a construction in which is included mechanism effecting an automatic steering control for the rear wheels of the trailer to cause them to track the turning wheels of the tractor.

Certain prior tractor-trailer constructions include means for steering or controlling movement of the rear wheels of the trailer either through hydraulic or mechanical steering mechanisms which are operated directly from the steering mechanisms of the tractor steering wheels. For the most part, these prior constructions generally operate to provide increased control of the trailer, but such constructions have numerous inherent disadvantages in their constructions.

First, to effectively control or steer the rear wheels of a trailer from the steering mechanism of the tractor turning wheels necessarily requires that a substantially bulky and expensive steering mechanism be incorporated in the trailer construction.

To incorporate such a steering mechanism in a trailer construction also requires substantial modifications in the normal trailer construction in order to provide proper accommodation in the trailer construction for locating and supporting such a separate steering mechanism.

Secondly, in the use of tractor-trailer constructions which include a separate steering mechanism for the rear wheels of the trailer, operated by the steering mechanism for the turning wheels of the tractor, there is created the time-consuming and laborious necessity of connecting and disconnecting the trailer wheel steering mechanism from the tractor steering mechanism each time the tractor and trailer are coupled and uncoupled.

Certain other prior tractor-trailer constructions include linkage steering mechanisms incorporated in the trailer construction for control of the rear wheels of the trailer wherein such mechanisms are operated by the turning movement of the tractor.

In certain of these latter type constructions the trailer steering linkage mechanisms include expensive and intricate hydraulic systems which are operably connected so as to effect a turning movement of the trailer wheels upon turning of the tractor, and the initial cost and upkeep of such hydraulic systems is quite substantial, as are the space requirements on the trailer to accommodate the same.

In other constructions of this latter type the turning mechanisms for the trailer wheels include a turntable arrangement on which the rear wheels of the trailer are mounted and the turntable is operably linked to the tractor to derive turning operation for the turntable from turning motion of the tractor.

These prior turntable and linkage mechanisms have been found to lack the structural strength, positive actuation factors, and smooth automatic operation which are necessary to the safe and satisfactory use of such equipment when incorporated in freight trailer constructions which normally operate under tremendous loads and stresses.

It is therefore a general object of the present invention to provide a tractor-trailer construction which includes means to automatically effect a turning motion or steering of the rear wheels of the trailer assembly so as to cause these wheels to absolutely track the front turning wheels of the trailer, which general construction overcomes the numerous disadvantages and faults inherent in prior constructions for the same general purposes.

Specifically, it is an object of the present invention to provide a steering or control mechanism and mounting arrangement for the rear wheels of a trailer assembly which will cause the rear wheels of the trailer assembly, automatically upon turning of the tractor, to absolutely track the turning wheels of the tractor to effect a tractor-trailer turning operation such as is common to streetcars, trains and the like.

Another object of the present invention is to provide a construction of the type generally described which will under all conditions automatically operate to produce the desired results described.

Still a further object of the present invention resides in the provision of a tractor-trailer assembly including a steering control for the rear wheels of the trailer assembly which will provide substantial improvement and ease of operation in the use of tractor-trailer constructions, and which structural assembly will not entail any additional time or labor requirements at the time of coupling and uncoupling of the tractor and trailer to operably engage and ready the steering mechanism for operation.

Another important object of the present invention lies in the provision of a steering arrangement for the rear wheels of a trailer construction which is so arranged and constructed as to provide for a substantially improved distribution of the load of the trailer assembly with respect to the trailer wheel positioning, and a steering construction which can be assembled with a normal and usual trailer construction without establishing any interference between the location and operation of the steering mechanism and the usual arrangement of the structural components going to constitute the trailer construction, and which will not unduly strain or overload the improved steering arrangements.

Yet another object of the instant invention lies in the provision of a construction of the type generally described which will greatly increase the safety of operation of tractor-trailer constructions by substantially reducing the tendencies of such constructions to tail whip, jackknife, skid or overturn, thereby increasing the safety of operation of the tractor-trailer, both with respect to the operator as well as with respect to other motorists on the highways.

Another important object of this invention is the provision of such a construction as described which does not necessitate any modification of usual trailer constructions in order to accommodate the present improvements, and to provide steering or control mechanism for effecting a tracking motion of the rear wheels of the trailer which is readily adaptable to trailers of varied bed lengths without substantial modification of such improvements other than in the increased dimensions of certain of the standard connecting parts thereof.

Still another object of the present invention lies in the provision of a construction for effecting tracking motion of the rear wheels of the trailer which is adaptable to trailer beds of different types, such as to covered carriers, open beds for pipe loads and the like without required modification of the improved mechanism or of the standard bed construction of the trailer type to which it is applied.

Also, it is an object of the present invention to provide a construction for effecting a tracking motion of the rear wheels of the trailer in a tractor-trailer construction wherein such mechanism is substantially durable and long lasting in use with a minimum requirement for adjustment and replacement of parts during such long duration, and a construction which is inexpensive of manufacture and maintenance.

Another object is to provide a semi-trailer construction in which a turntable is mounted at the forward end of the trailer and provided with a king pin adapted to be received in an aperture in a flanged fifth wheel plate upon the tractor, the turntable having flat sides received between the flanges of the fifth wheel plate, the rear truck of the trailer being rotatably and longitudinally mounted upon the trailer and connected by crossed rods to the turntable.

The above and other objects, apparent from the drawings and following description, may be attained, the above described difficulties overcome and the advantages and results obtained, by the apparatus, construction, arrangement and combinations, subcombinations and parts which comprise the present invention; a preferred embodiment of which, illustrative of the best mode in which applicant has contemplated applying the principle, being set forth in detail in the following description and illustrated in the accompanying drawings, in which:

Fig. 1 is a side elevation of the novel semi-trailer construction embodying the invention;

Fig. 2 a top plan view of the semi-trailer;

Fig. 3 a similar view showing the position of the parts in making a turn;

Fig. 4 an enlarged side elevation of the connected forward end portion of the trailer and rear end portion of the tractor, showing the turntable and fifth wheel plate forming an important part of the invention;

Fig. 5 a transverse section taken as on the line 5—5, Fig. 4;

Fig. 6 a longitudinal sectional view taken as on the line 6—6, Fig. 5;

Fig. 7 a side elevation of the rear end portion of the trailer and the rear truck therefor;

Fig. 8 a transverse section taken as on the line 8—8, Fig. 7;

Fig. 9 a longitudinal section taken as on the line 9—9, Fig. 8; and,

Fig. 10 a view similar to Fig. 9 showing the position of these parts in making a turn.

Referring now more particularly to the embodiment of the invention illustrated in the drawings, a tractor is indicated generally at 15 and a semi-trailer at 16. The tractor has front wheels 17 adapted to be steered in any usual and well known manner, which in itself forms no part of the present invention excepting that it is necessary that the tractor, as in usual practice, be provided with conventional means for steering the front wheels so as to make turns.

At the rear end portion of the frame 18 of the tractor semi-elliptic springs 19 are suspended by conventional shackles 20 for mounting the rear axles 21 of the tractor, which, as in usual practice, are connected to the springs as by the U-bolts 22, the rear wheels 23 of the tractor being mounted upon these axles.

A fifth wheel plate 24 is carried by the rear portion of the frame 18 of the tractor, and is so mounted that it is held against turning movement on a vertical axis relative to the tractor. However, this fifth wheel plate is preferably so mounted that it may have a slight rocking movement upon a horizontal axis located transversely of the tractor, as is common in fifth wheel constructions for tractor-trailer combinations.

For this purpose the fifth wheel plate 24 is provided at each side with depending bearing brackets 25, through which is journalled the transversely disposed shaft 26, located through the upstanding bearing brackets 27 upon the frame 18.

A coil spring 28 may be interposed between the forward end portion of the fifth wheel plate 24 and the frame 18 to normally urge the plate toward a downwardly and rearwardly inclined position, for ease in coupling a trailer thereto, as in conventional practice.

The fifth wheel plate 24 is of generally rectangular shape, although if desired the front corners thereof may be bevelled as indicated at 29 in Figs. 2 and 3. An upstanding flange 30 is formed at each straight parallel side edge of the plate 24, and this flange may extend around the forward edge of the plate as shown.

A slot 31 is provided in the median line of the plate 24, extending from an intermediate point on the plate through the rear edge thereof, as is customary in a lower fifth wheel plate. At the forward end of this slot the usual locking mechanism 32 is attached to the underside of the plate 24, and adapted to receive and lock the king bolt of the trailer as in usual practice.

The fifth wheel construction includes a turntable 34 rotatably mounted on the underside of the bed of the trailer 16. This turntable is of substantially the same shape as the fifth wheel plate 24, having straight parallel side edges adapted to contact the flanges 30 at the straight side edges of the plate 24, and is provided at its rear end with the rearwardly disposed ears 35 extending beyond the plate 24.

A king bolt 36 is centrally located through the turntable 34 and is rigidly attached thereto by any suitable means such as welding, sweating, press-fitting or the like. For the purpose of rotatably mounting the turntable on the trailer bed, a bearing plate 37 is attached to the underside of the trailer bed as by screws 38 or the like, and has a central portion 39 of increased thickness formed upon or integrally attached to its underside.

The upper end portion of the king bolt 36 is journalled through a bearing opening 40 in the bearing plate and is retained therein by means of the washer 41 and nuts 42 located upon the threaded upper end portion of the king bolt and being received within a recess 42' in the trailer bed.

Circular ball races 43 and 44, concentric with the king bolts 36 are formed in the opposed surfaces of the turntable and bearing plate respectively to accommodate the bearing balls 45. The nuts 42 may be adjusted upon the upper end of the king bolt to provide the proper spacing between the turntable and bearing plate to accommodate the balls 45, and may be adjusted from time to time to compensate for wear.

A rear truck is provided upon the trailer, being mounted for rotatable and longitudinal movement relative to the trailer. This truck may be in the form of a rectangular plate 46 having semi-elliptic springs 47 suspended therebeneath as by shackles 48. Rear axles 49 are attached to the springs 47 in usual and well known manner as by the U-bolts 50 and rear wheels 51 are mounted upon these axles.

For the purpose of mounting the rear truck for rotatable and longitudinal movement relative to the trailer bed, a bed plate 52 is attached to the underside of the trailer bed. A flanged upper portion 53 may be formed upon, or integrally connected to this bed plate and attached to the underside of the trailer bed as by screws 54 or the like.

Longitudinally disposed guide ways 55 are provided in the side edges of the bed plate 52 and a mounting plate 56 is slidably mounted therein. The mounting plate 56 has a central aperture 57 communicating with the enlarged circular recess 58 in the upper side of the mounting plate.

The king pin 59 is located through the aperture 57 in the mounting plate and provided with a disc-like head 60 received within the recess 58. The king pin extends down through an aperture 61 in the truck plate 46, which functions as a turntable.

Circular race-ways 62 and 63, concentric with the king pin 59, are formed in the opposed faces of the truck plate 46 and the mounting plate respectively, and bearing balls 64 are located in these race-ways.

The lower threaded end of the king pin 59 extends below the truck plate 46 and a washer 65 and nuts 66 are located thereon for assembling the king bolt and the plates 46 and 56 and providing proper adjustment to permit the bearing balls 64 to operate therebetween. Forwardly disposed ears 67 are formed upon the forward end of the truck plate.

For the purpose of operatively connecting the front turntable to the rear truck so as to cause the same to turn by turning movement of the tractor, whereby the rear wheels 51 will track the tractor wheels 23, an arrangement of cross rods is provided.

As shown in the drawings, a pair of crossed rods 68 is provided. Each of these rods has a bifurcated coupling 69 fixed to each end for connection to the turntable 34 and truck plate 46. As best shown in Figs. 2 and 3, the bifurcated coupling 69 at the forward end of one rod is connected to the ear 35 on the right hand side of the turntable 34, while the coupling 69 at the rear end of said rod is connected to the ear 67 on the left hand side of the truck plate 46, and the other rod is similarly connected at its forward end to the left hand ear 67 of the turntable 34 and its rear end to the right hand side of the truck plate 46.

The bifurcated couplings 69 are connected to the ears 35 and 67 of the turntable and truck plate respectively as by vertical pivot pins 70, as best shown in Fig. 7. As in usual practice a pair of auxiliary wheels 71 may be provided near the forward end of the trailer bed for supporting the same when disconnected from the tractor.

For the purpose of indicating to the driver the amount of turning movement of the tractor wheels 23 relative to the trailer, an indicating hand 72 may be rigidly connected to the forward end of the turntable 34, at the median line thereof, and extends forwardly to a point beyond the front end of the trailer and then upwardly as indicated at 72'.

By glancing through the rear window of the tractor cab the driver can instantly ascertain the amount of turning movement of the tractor wheels 23 relative to the trailer.

In order to connect the trailer to the tractor, it is only necessary to move the tractor backward under the trailer to permit the king pin 36 to be guided through the slot 31 in the fifth wheel plate 24 to the front end of said slot when the king pin is locked in usual manner by the locking mechanism 32 of the fifth wheel plate. The trailer is thus coupled to the tractor as best shown in Fig. 6 and ready for operation.

The crossed rod 68 will at all times hold the rear truck plate 46 in such position that the rear wheels 51 of the trailer will accurately follow the wheels 23 of the tractor. With the vehicle traveling in a straight line, as shown in Fig. 2, the wheels 51 will travel in a straight line directly in the tracks of the wheels 23.

As the tractor 15 turns relative to the trailer 16, as shown in Fig. 3, the fifth wheel plate 24 of the tractor will turn relative to the trailer, moving the wheels 23 therewith, as shown in said figure.

The turntable 34 being held by the side flanges 30 of the fifth wheel plate will be caused to turn with the fifth wheel plate as shown in Fig. 3, and through the crossed rods 68 the truck plate 46 will be rotated upon the king pin 59 and at the same time the king pin will be caused to move forward longitudinally sliding the mounting plate 56 forwardly in the guide ways 55 of the bed plate 52, the parts assuming the positions shown in Figs. 3 and 10.

This turning of the rear truck plate 46 causes the rear wheels 51 of the trailer to turn as shown in Fig. 3, so that they will track directly behind the tractor wheels 23 as the vehicle negotiates the turn.

When it is desired to uncouple the trailer from the tractor it is only necessary to raise the forward end of the trailer sufficiently high to disengage the king pin 36 from the fifth wheel plate 24.

The fifth wheel 34 at all times remains operatively connected to the rear truck plate 46 through the crossed rods 68 so that there is never any time-consuming and laborious operation of connecting or disconnecting the trailer wheel steering mechanism from the tractor steering mechanism each time the tractor and trailer are coupled or uncoupled.

The construction is simple, inexpensive and efficient in operation causing all wheels to track one another in the manner of a street car traveling upon tracks.

Furthermore, this construction reduces the tendency to jackknife and to tail whipping, tends to prevent upsetting or overturning of the vehicle, and provides a better distribution of weight.

This construction also provides a safety factor in traffic as it tends to reduce the possibility of skidding and provides for increased ease and facility in maneuverability.

The chassis being outside of the wheel line instead of inside of the wheel line places the weight over the wheels and obviates any chassis interference with the moving parts and turning mechanism.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful constructions, and reasonable mechanical equivalents thereof obvious to those skilled in the art, are set forth in the appended claims.

I claim:

1. In tractor and trailer construction comprising a tractor having rear wheels and a semi-trailer, a fifth wheel coupling plate on the tractor, a fifth wheel on the forward end of the trailer, means operatively engaging said fifth wheel with the coupling plate on the tractor, a fifth wheel truck construction mounting wheels under the rear end of the trailer, said fifth wheel truck construction including a mounting plate longitudinally slidably mounted upon the trailer, and linkage operatively connected to the forward and rear fifth wheels whereby turning movement of the tractor will cause turning movement of the trailer rear wheels to track the rear wheels of the tractor.

2. In tractor and trailer construction comprising a tractor having rear wheels and a semi-trailer, a fifth wheel coupling plate on the tractor, straight upright flanges on the side edges of the coupling plate, a fifth wheel on the forward end of the trailer, means operatively engaging said fifth wheel with the coupling plate on the tractor, said means including straight side edges on the fifth wheel engaging said flanges, a fifth wheel truck construction mounting wheels under the rear end of the trailer, said fifth wheel truck construction including a mounting plate longitudinally slidably mounted upon the trailer, and linkage operatively connected to the forward and rear fifth wheels whereby turning movement of the tractor will cause turning movement of the trailer rear wheels to track the rear wheels of the tractor.

3. In tractor and trailer construction comprising a tractor having rear wheels and a semi-trailer, a fifth wheel coupling plate on the tractor, a fifth wheel on the forward end of the trailer, said fifth wheel comprising a bearing plate fixed to the trailer, a king bolt journalled in the bearing plate, and a turntable fixed upon the king bolt, means operatively engaging said fifth wheel with the coupling plate on the tractor, a fifth wheel truck construction mounting wheels under the rear end of the trailer, said fifth wheel truck construction including a mounting plate longitudinally slidably mounted upon the trailer, and linkage operatively connected to the forward and rear fifth wheels whereby turning movement of the tractor will cause turning movement of the trailer rear wheels to track the rear wheels of the tractor.

4. In tractor and trailer construction comprising a tractor having rear wheels and a semi-trailer, a fifth wheel coupling plate on the tractor, a fifth wheel on the forward end of the trailer, means operatively engaging said fifth wheel with the coupling plate on the tractor, a fifth wheel truck construction mounting wheels under the rear end of the trailer, said fifth wheel truck construction including a mounting plate longitudinally slidably mounted upon the trailer, a king bolt journalled in said mounting plate and a turntable rotatable about the king bolt, and linkage operatively connected to the forward and rear fifth wheels whereby turning movement of the tractor will cause turning movement of the trailer rear wheels to track the rear wheels of the tractor.

5. In tractor and trailer construction comprising a tractor having rear wheels and a semi-trailer, a fifth wheel coupling plate on the tractor, straight upright flanges on the side edges of the coupling plate, a fifth wheel on the forward end of the trailer, means operatively engaging said fifth wheel with the coupling plate on the tractor, said means including straight side edges on the fifth wheel engaging said flanges, a fifth wheel truck construction mounting wheels under the rear end of the trailer, said fifth wheel truck construction including a mounting plate longitudinally slidably mounted upon the trailer, a king bolt journalled in said mounting plate and a turntable rotatable about the king bolt, and linkage operatively connected to the forward and rear fifth wheels whereby turning movement of the tractor will cause turning movement of the trailer rear wheels to track the rear wheels of the tractor.

6. In tractor and trailer construction comprising a tractor having rear wheels and a semi-trailer, a fifth wheel coupling plate on the tractor, a fifth wheel on the forward end of the trailer, means operatively engaging said fifth wheel with the coupling plate on the tractor, a fifth wheel truck construction mounting wheels under the rear end of the trailer, said fifth wheel truck construction including a mounting plate longitudinally slidably mounted upon the trailer, a king bolt journalled in said mounting plate and a turntable rotatable about the king bolt, and linkage operatively connected to the forward and rear fifth wheels whereby turning movement of the tractor will cause turning movement of the trailer rear wheels to track the rear wheels of the tractor.

7. In tractor and trailer construction comprising a tractor having rear wheels and a semi-trailer, a fifth wheel coupling plate on the tractor, straight upright flanges on the side edges of the coupling plate, a fifth wheel on the forward end of the trailer, said fifth wheel comprising a bearing plate fixed to the trailer, a king bolt journalled in the bearing plate, and a turntable fixed upon the king bolt, means operatively engaging said fifth wheel with the coupling plate on the tractor, said means including straight side edges on the fifth wheel engaging said flanges, a fifth wheel truck construction mounting wheels under the rear end of the trailer, said fifth wheel truck construction including a mounting plate longitudinally slidably mounted upon the trailer, and linkage operatively connected to the forward and rear fifth wheels whereby turning movement of the tractor will cause turning movement of the trailer rear wheels to track the rear wheels of the tractor.

8. In tractor and trailer construction comprising a tractor having rear wheels and a semi-trailer, a fifth wheel coupling plate on the tractor, straight upright flanges on the side edges of the coupling plate, a fifth wheel on the forward end of the trailer, said fifth wheel comprising a bearing plate fixed to the trailer, a king bolt journalled in the bearing plate, and a turntable fixed upon the kind bolt, means operatively engaging said fifth wheel with the coupling plate on the tractor, said means including straight side edges on the fifth wheel engaging said flanges, a fifth wheel truck construction mounting wheels under the rear end of the trailer, said fifth wheel truck construction including a mounting plate longitudinally slidably mounted upon the trailer, a king bolt journalled in said mounting plate and a turntable rotatable about the king bolt, and linkage operatively connected to the forward and rear fifth wheels whereby turning movement of the tractor will cause turning movement of the trailer rear wheels to track the rear wheels of the tractor.

9. In tractor and trailer construction comprising a tractor having rear wheels and a semi-trailer, a fifth wheel coupling plate on the tractor, straight upright flanges on the side edges of the coupling plate, a fifth wheel on the forward end of the trailer, said fifth wheel comprising a bearing plate fixed to the trailer, a king bolt journalled in the bearing plate, and a turntable fixed upon the king bolt and bearing balls located between the bearing plate and the turntable, means operatively engaging said fifth wheel with the coupling plate on the tractor, said means including straight side edges on the fifth wheel engaging said flanges, a fifth wheel truck construction mounting wheels under the rear end of the trailer, said fifth wheel truck construction including a mounting plate longitudinally slidably mounted upon the trailer, a king bolt journalled in said mounting plate and a turntable rotatable abount the king bolt, and bearing balls located between the mounting plate and the turntable, and linkage operatively connected to the forward and rear fifth wheels whereby turning movement of the tractor will cause turning movement of the trailer rear wheels to track the rear wheels of the tractor.

References Cited in the file of this patent

UNITED STATES PATENTS

| | | |
|---|---|---|
| 2,223,436 | Winn | Dec. 3, 1940 |
| 2,433,269 | Fellabaum | Dec. 23, 1947 |

FOREIGN PATENTS

| | | |
|---|---|---|
| 187,150 | Great Britain | Oct. 19, 1922 |
| 194,726 | Great Britain | Aug. 2, 1923 |
| 226,848 | Great Britain | Jan. 8, 1925 |
| 636,135 | Great Britain | May 27, 1947 |
| 54,895 | Netherlands | July 15, 1943 |
| 451,567 | Germany | Oct. 28, 1927 |